United States Patent [19]
Hepburn et al.

[11] Patent Number: 5,750,082
[45] Date of Patent: May 12, 1998

[54] NOX TRAP WITH IMPROVED PERFORMANCE

[75] Inventors: Jeffrey Scott Hepburn, Dearborn; Eva Thanasiu, Trenton, both of Mich.; William Lewis Henderson Watkins, Toledo, Ohio; Carolyn Parks Hubbard, Dearborn Heights, Mich.; Douglas A. Dobson, Livonia, Mich.; Haren Sakarlal Gandhi, Farmington Hills, Mich.

[73] Assignee: Ford Global Technologies, Inc., Dearborn, Mich.

[21] Appl. No.: 531,512

[22] Filed: Sep. 21, 1995

[51] Int. Cl.⁶ .......................... B01D 53/94; B01J 20/04; B01J 23/02
[52] U.S. Cl. ........................ 423/213.5; 423/213.7; 423/239.1; 60/299; 60/311; 502/304; 502/328; 502/330; 502/400
[58] Field of Search ............... 423/213.5, 239.1, 423/213.7; 502/304, 328, 330, 400, 415; 60/299, 311

[56] References Cited

U.S. PATENT DOCUMENTS

| | | | |
|---|---|---|---|
| 3,388,077 | 6/1968 | Hoekstra | 423/213.5 |
| 4,369,132 | 1/1983 | Kinoshita | 423/213.5 |
| 4,497,783 | 2/1985 | Barber | 423/213.5 |
| 4,621,071 | 11/1986 | Blanchard | 423/213.5 |
| 4,675,308 | 6/1987 | Wan et al. | 502/304 |
| 4,760,044 | 7/1988 | Joy, III et al. | 502/303 |
| 4,769,356 | 9/1988 | Takeuchi | 423/213.5 |
| 4,849,398 | 7/1989 | Takada et al. | 423/213.5 |
| 4,902,664 | 2/1990 | Wan | 502/300 |
| 5,075,275 | 12/1991 | Murakami et al. | 423/213.5 |
| 5,279,115 | 1/1994 | Inoue | 60/276 |
| 5,388,403 | 2/1995 | Nagami | 60/276 |
| 5,406,790 | 4/1995 | Hirota | 60/276 |
| 5,471,836 | 12/1995 | Takeshima | 60/297 |

FOREIGN PATENT DOCUMENTS

| | | |
|---|---|---|
| 0573672 A1 | 12/1992 | European Pat. Off. |
| 0562516 A1 | 3/1993 | European Pat. Off. |
| 0580389 | 7/1993 | European Pat. Off. |
| 0582917 A1 | 7/1993 | European Pat. Off. |
| 0589393 A2 | 7/1993 | European Pat. Off. |
| 0613714 A2 | 1/1994 | European Pat. Off. |
| 0 666 103 A1 | 2/1995 | European Pat. Off. |
| 0 669 157 A1 | 2/1995 | European Pat. Off. |
| 0 716 876 A1 | 12/1995 | European Pat. Off. |
| S61-111127 | 5/1986 | Japan. |
| 4-197447 | 7/1992 | Japan. |
| 4-354536 | 12/1992 | Japan. |
| H5-277376 | 10/1993 | Japan. |
| H5-317652 | 12/1993 | Japan. |
| 7-108172 | 4/1995 | Japan. |
| WO 95/00235 | 1/1995 | WIPO. |

*Primary Examiner*—Steven Bos
*Assistant Examiner*—Peter DiMauro
*Attorney, Agent, or Firm*—Lorraine S. Melotik

[57] ABSTRACT

The invention is a nitrogen oxide trap separate catalyst phases. One of the phases is platinum on a porous support and another is alkali metal or elements and alkaline earth elements on another porous support. The phases may be provided as an intimate mixture or as layers in the trap. The trap may be used in an internal combustion engine exhaust gas catalyst system. During lean-burn operation of the engine the trap adsorbs nitrogen oxides and releases the nitrogen oxides during decreased oxygen concentration in the exhaust gas.

17 Claims, 2 Drawing Sheets

NOX TRAP WITH IMPROVED PERFORMANCE

FIELD OF THE INVENTION

This invention relates to nitrogen oxide traps employed in the exhaust system of an internal combustion engines to absorb nitrogen oxides during lean-burn operation.

BACKGROUND OF THE INVENTION

Catalysts are employed in the exhaust systems of automotive vehicles to convert carbon monoxide, hydrocarbons, and nitrogen oxides ($NO_x$) produced during engine operation into more desirable gases. When the engine is operated in a stoichiometric or slightly rich air/fuel ratio, i.e., between about 14.7 and 14.4, catalysts containing palladium or platinum are able to efficiently convert all three gases simultaneously. That is, the carbon monoxide and hydrocarbons are oxidized to carbon dioxide and water and the $NO_x$ is reduced to nitrogen. Hence, such catalysts are often called "three-way" catalysts. It is desirable, however, to operate the engine in a "lean-burn" condition where the A/F ratio is greater than 14.7, generally between 19 and 27, to realize a benefit in fuel economy. While such three-way catalyst containing or palladium platinum are able to convert carbon monoxide and hydrocarbons during lean-burn (excess oxygen) operation, they are not efficient in reducing the $NO_x$.

It has become known that certain materials like potassium or strontium (hereafter "alkaline materials") in combination with platinum are capable of storing (absorbing) nitrogen oxides under conditions of excess oxygen. The widely held mechanism for this phenomena is that the platinum first oxidizes NO to $NO_2$ and the $NO_2$ subsequently forms a nitrate complex with the alkaline material. In a stoichiometric or rich environment, the nitrate is thermodynamically unstable, and the stored $NO_x$ is released. $NO_x$ then catalytically reacts with reducing species in the exhaust gas to form $N_2$. These so-called "$NO_x$ traps" are currently receiving considerable attention because they have application for removing $NO_x$ from the exhaust gas of internal combustion engines during lean burn operation.

The conventional method of preparing these traps involves impregnating the platinum and alkaline material precursors together into a porous support material such as alumina. This washcoat material may then be applied to a honeycomb substrate through which the gases pass. However, we have found that, the nitrogen oxide trap performance can be significantly improved by forming the washcoat in a different manner according to the present invention as described below.

DISCLOSURE OF THE INVENTION

This invention is directed to a nitrogen oxide ($NO_x$) trap useful to trap nitrogen oxides during the lean-burn (excess-oxygen) operation of an internal combustion engine. This trap comprises distinct catalyst phases of: (a) a porous support loaded with 0.1 to 5 weight % catalyst comprising platinum; and (b) another porous support loaded with 2 to 30 weight % catalyst of at least one material selected from the group consisting of alkali metal elements and alkaline earth elements, the weight % of catalyst being based on the weight of the porous support. The trap preferably comprises an intimate mixture of catalyst phases (a) and (b) rather than separate layers of catalyst phases (a) and (b). If more than one catalyst material (b) is selected, they may be provided together on one porous support or on individual porous supports.

In another aspect, the invention is an internal combustion engine exhaust gas catalyst system comprising the $NO_x$ trap. The trap is arranged in the exhaust system and absorbs $NO_x$ when the air/fuel ratio of exhaust gas flowing into said trap is lean and releases the absorbed $NO_x$ when the oxygen concentration in the exhaust gas is lowered, as during stoichiometric operation of the engine. According to another aspect, the invention is a process for trapping nitrogen oxides using the nitrogen oxide trap of the present invention disclosed above.

Advantageously, we have found that $NO_x$ traps according to the present invention have improved $NO_x$ sorption efficiency as compared to conventional $NO_x$ traps where materials like platinum and alkaline materials are loaded together on the same support. We suspect that a deleterious interaction takes place in conventional traps between the platinum and alkaline materials when they share the same support material and hence are in intimate contact with each other.

DESCRIPTION OF PREFERRED EMBODIMENTS

Figure 1:
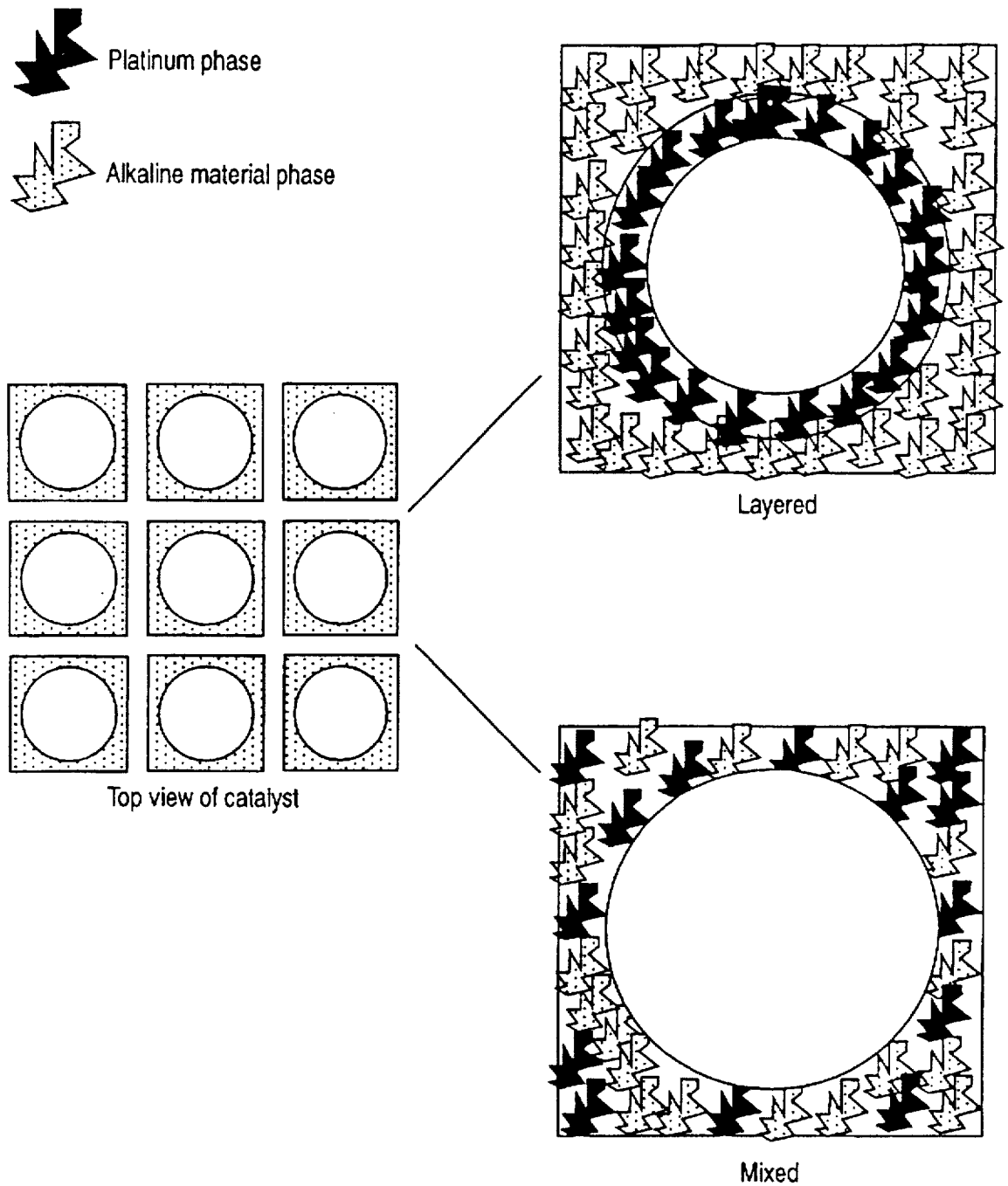
FIGS. 1A (layered) and 1B (intimate mixture) are schematic drawings showing $NO_x$ traps according to embodiments of the present invention.

This invention, according to one aspect, is directed to an internal combustion engine exhaust gas catalyst system comprising a nitrogen oxide trap. The $NO_x$ trap comprises catalysts of platinum and at least one material selected from alkali metal elements and alkaline earth metal elements. According to the present invention, it is critical that the catalyst comprising platinum is loaded on a different porous support than that carrying the alkali metal elements or alkaline earth metal elements.

In forming catalyst phase (a), a loading of about 0.1 to 5 weight percent platinum catalyst, preferably between about 0.5 and 2 percent platinum, is employed, based on the weight of the support on which it is loaded. In forming catalyst phase (b), a loading of about 2 to 30 weight percent catalyst selected from alkali metal and alkaline earth metals, preferably between about 10 and 20 percent such materials, is employed, based on the weight of the support on which these materials are loaded. Exemplary of alkali metal elements which may be employed include, but are not limited to, potassium, sodium, cesium, and lithium. Exemplary of alkaline earth elements which may be employed include, but are not limited to, strontium, calcium, and barium. In forming catalyst phase (b), if more than one such catalyst is employed, e.g., potassium and barium, they may be provided together on the same porous support or on their own individual porous supports. These distinct catalysts phases (a) and (b) may be provided as an intimate mixture thereof or as layers in the $NO_x$ trap.

Each catalyst phase used in the nitrogen oxide trap comprises a catalyst loaded on a porous support (washcoat) material, which is a high surface area material like alumina, preferably being γ-alumina. Still other types of washcoat materials which may be used at the high operating temperatures associated with an internal combustion engine exhaust system include, but are not limited to, zeolite, zirconia, alpha alumina, cerium oxide (ceria), and magnesium oxide. Such washcoat materials, useful for carrying catalyst materials, are well known to those skilled in the art. The choice of the particular porous support (washcoat) material is not critical to this invention. Desirably, the support material has a surface area between about 10 and 300 $m^2/g$. Each catalyst may be provided on the same or different type of porous support material. For example, according to one embodiment, the platinum catalyst may be loaded on ceria and the barium catalyst may be loaded on alumina. Preferably, however, the first porous support and the second porous support used for the respective catalysts is of the same type and is γ-alumina.

Generally, to provide a catalyst onto a porous support, a catalyst precursor compound is impregnated onto the support from a solution thereof by incipient wetness techniques. The solution can be water or organic solvent based. One embodiment invention trap may comprise platinum and strontium catalysts each deposited on different γ-alumina support portions. According to such techniques, to load platinum onto γ-alumina, the alumina may be impregnated with an aqueous solution of hexachloplatinic acid. After impregnation, the material may be dried and calcined. If the porous support is other than ceria, e.g., γ-alumina, it is desirable to also incorporate via impregnation some rhodium and/or ceria into the platinum containing phase. The preferred rhodium concentration would be between 1/5 and 1/10 (by weight) of the platinum loading. The preferred ceria loading would range from 2 to 20 weight % of the porous support.

Strontium may be provided on a porous support in the same way from, e.g., strontium nitrate. Hence, another portion of γ-alumina could be impregnated with an aqueous solution of strontium nitrate and then dried. As discussed above, catalyst phase (b) comprises at least one material selected from alkali metal and alkaline earth metals. Thus, for example, if two such materials like potassium and cesium are employed, each may be provided on their own porous support (which may be of the same or different type) or provided together onto a single portion of porous support. It is only critical that neither of these materials be provided on the porous support carrying the platinum catalyst.

For useful application in an exhaust system, these catalyst phases will be carried on a substrate of a high temperature stable, electrically insulating material. Typical of such substrate materials are cordierite, mullite, etc. The substrate may be in any suitable configuration, often being employed as a monilithic honeycomb structure, spun fibers, corrugated foils or layered materials. Still other materials and configurations useful in this invention and suitable in an exhaust gas system will be apparent to those skilled in the art in view of the present disclosure.

The catalyst phase materials are generally applied as a slurry (washcoat) thereof onto the substrate. The catalyst phase materials may be washcoated as a mixture thereof or in sequential steps to form layers of the phases on the substrate, in a manner which would be readily apparent to those skilled in the art of catalyst manufacture. In either case, after applying the washcoat to the substrate, the materials are generally dried and calcined at elevated temperature. FIGS. 1 schematically show an intimate mixture embodiment (FIG. 1B) and a layered embodiment (FIG. 1A) of the present invention. The intimate mixture embodiment is preferred since it provide more efficient $NO_x$ removal. We believe that this advantage results because $NO_2$ can be absorbed by the alkaline material phase (b) immediately after it is formed over the platinum phase (a), hence driving the thermodynamically constrained $NO+½O_2=NO_2$ reaction in the favorable direction. With the platinum and the alkali metal phases separated into distinct washcoat layers, in contrast, a $NO_2$ molecule which is formed over the platinum phase needs to first diffuse through the platinum containing washcoat layer before it can be adsorbed by the alkali metal. Under this scenario, the $NO$ to $NO_2$ reaction is more thermodynamically constrained and $NO_x$ sorption efficiency is lower. While this theory has been put forth to explain this advantage, neither its accuracy nor understanding is necessary for the practice of the present invention.

The internal combustion engine catalyst system of this invention may include, in addition to the nitrogen oxide trap, another catalyst device such as a three-way catalyst containing, for example, palladium, platinum and rhodium, or palladium and rhodium. The three-way catalyst device can be placed upstream of the $NO_x$ trap, hence closer to the engine. In such an arrangement, the three-way catalyst being closely mounted to the engine would warm up quickly and provide for efficient engine cold start emission control. Once the engine is warmed up, the three-way catalyst will remove hydrocarbons, carbon monoxide, and nitrogen oxides from the exhaust during stoichiometric operation and hydrocarbons and carbon monoxide during lean operation. The $NO_x$ trap would be positioned downstream of the three-way catalyst where the exhaust gas temperature enables maximum $NO_x$ trap efficiency. During periods of lean engine operation when $NO_x$ passes through the three-way catalyst, $NO_x$ is stored on the trap. The $NO_x$ trap may be periodically regenerated by short periods or intervals of slightly rich engine operation. With the $NO_x$ trap positioned downstream of the three-way catalyst in a more remote location relative the engine, it is protected against very high exhaust gas temperatures which could damage the trap. It may also be considered desirable to optionally place a second three-way catalyst downstream of the $NO_x$ trap in order to provide for efficient reduction of the $NO_x$ which desorbs from the trap during regeneration.

If rhodium and ceria are incorporated into the platinum containing phase of the trap washcoat as disclosed above, this $NO_x$ trap may desirably be use without a three-way catalyst. In this case, the platinum/rhodium/ceria containing phase of the $NO_x$ trap provides the three-way catalyst function and hence $NO_x$ control under stoichiometric engine operation.

EXAMPLE 1

For comparison, a nitrogen oxide trap (Trap A) was prepared not according to the present invention. It was prepared as follows: γ-alumina powder (100m2/g) was impregnated via incipient wetness with an aqueous solution of strontium nitrate. The impregnated powder was then dried (120° C.) and calcined (500° C.). The resulting material was then impregnated via incipient wetness with an aqueous solution containing hexachloroplatinic acid. The material was then subsequently dried (120° C.) and calcined (500° C.). The strontium nitrate and hexachloroplatinic acid concentrations were adjusted so as to provide 10 wt. % strontium and 2 wt. % platinum on the finished material. The resulting Pt/Sr/γ-alumina powder was ball milled and mixed with distilled water to produce a slurry. The slurry was applied to a corderite monolith (400 cell/in$^2$) to obtain a 25 wt. % loading of Pt/Sr/γ-alumina on the monolith. The monolith was subsequently dried at 120° C. and calcined in air at 500° C.

A nitrogen oxide trap (Trap B) according to an embodiment of the present invention was prepared. It involved first preparing distinct phases of Sr/γ-alumina and Pt/γ-alumina and then forming an intimate mixture of these two phases and applying it to a monolith as follows. γ-alumina loaded with strontium was prepared by taking γ-alumina powder (100m2/g) and impregnating it via incipient wetness with an aqueous solution of strontium nitrate. The impregnated powder was dried at 120° C. and calcined at 500° C. The strontium nitrate concentration was adjusted in order to provide for 20 wt. % strontium on the finished material. The platinum was loaded on alumina by impregnating another amount of γ-alumina powder of the type above with an aqueous solution of hexachloroplatinic acid by incipient wetness. The solution concentration was fixed so as to yield 4 wt. % platinum on the alumina. Following impregnation, the material was dried and calcined as above for the strontium. Equal parts by weight of the Sr/γ-alumina and Pt/γ-alumina powders were mixed together and ball milled. Water was then added to the resulting material to produce a slurry. The slurry was applied to a corderite monolith (400 cells/in$^2$) to obtain a 25 wt. % loading on the monolith. The monolith was subsequently dried at 120° C. to remove the water and calcined at 500° C. in air for 6 hours.

Figure 2:
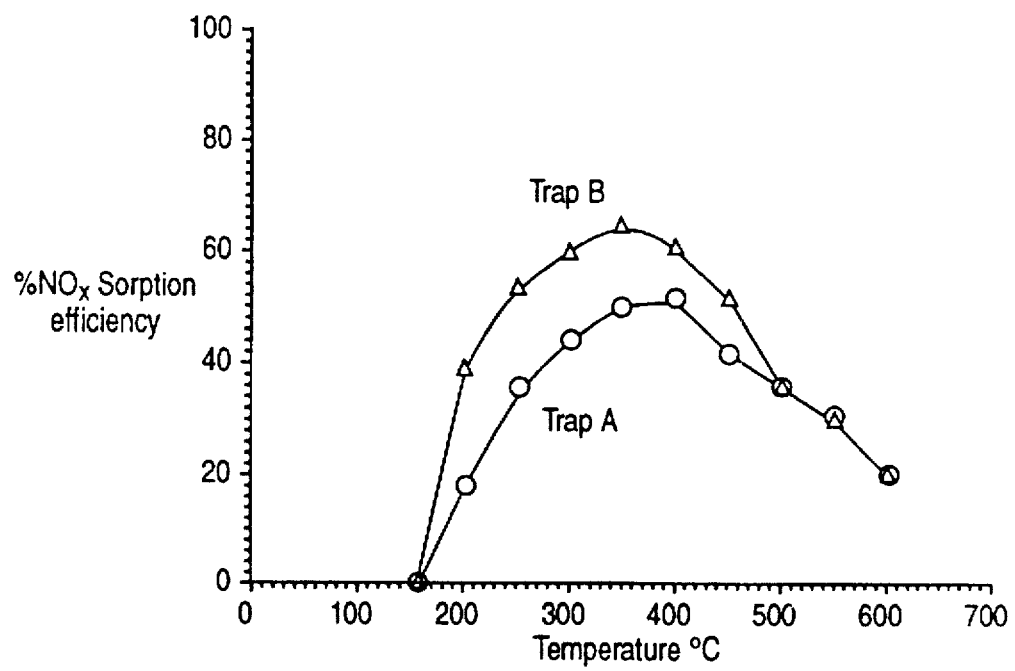
FIG. 2 is a graph showing the nitrogen oxide trapping efficiency of $NO_x$ trap A (comparative example) and $NO_x$ trap B (an embodiment of the present invention).

FIG. 2 compares the $NO_x$ sorption efficiency for the two platinum-strontium $NO_x$ traps A and B made above. Trap A comprises the platinum and strontium loaded together on the same alumina while trap B comprises two separate phases in an intimate mixture: platinum on alumina and the strontium on other alumina. Both of these traps have identical amounts of platinum and strontium loadings on the monolith. From the figure, it can be seen that trap B (made according to an embodiment of the present invention) has better efficiency than trap A (not according to the present invention). It is believed that by providing the catalysts on separate support materials as in the present invention trap B, deleterious interactions between the platinum and alkaline metal are avoided which occur when they are provided together on the same alumina its in trap A.

EXAMPLE 2

Figure 3:
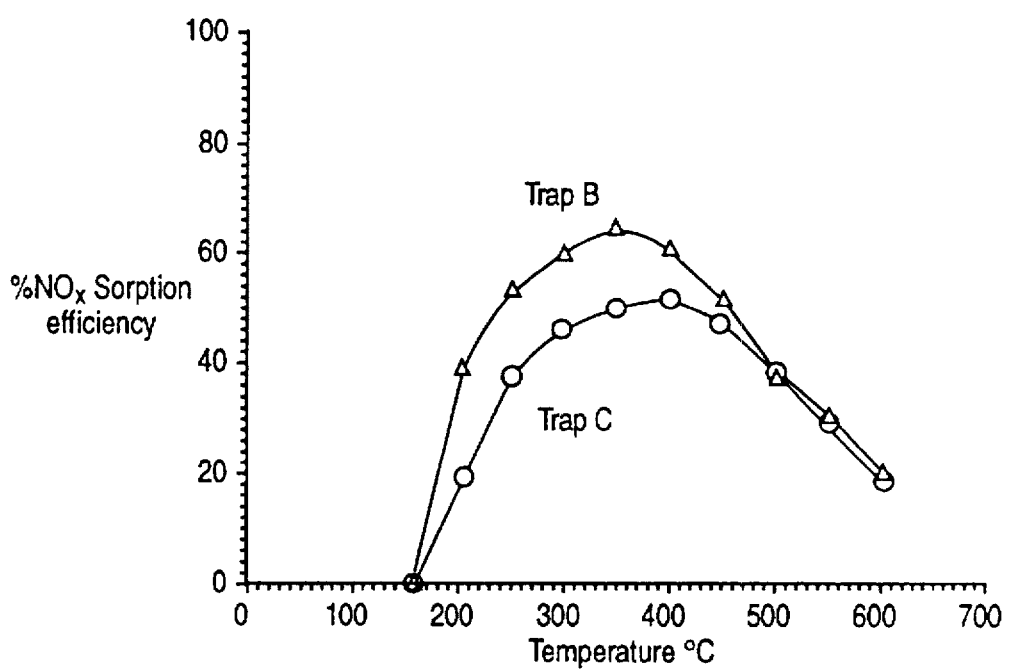
FIG. 3 is a graph showing the nitrogen oxide trapping efficiency of $NO_x$ trap B and $NO_x$ trap C, both embodiments of the present invention.

This example prepares another embodiment of a trap according to the present invention. Trap C of this example contains the two phases of platinum/γ-alumina and platinum/γ-alumina as two layers on the monolith. The nitrogen oxide trap efficiency of "layered" trap C is compared in FIG. 3 with that of trap B which uses similar catalysts but in an intimate mixture. Trap C was prepared as follows. 4 wt. % Pt/γ-alumina and 20 wt. % Sr/γ-alumina powders were prepared following the procedure for trap B. The Sr/γ-alumina powder was ball milled and mixed with distilled water to produce a slurry of the material. The slurry was applied to a corderite monolith (400 cell/in$^2$) to obtain a 12.5 wt. % loading of the material onto the monolith. The monolith was then dried at 120° C. and calcined in air at 500° C. Next, the Pt/γ-alumina powder was ball milled and mixed with distilled water to produce a slurry. This slurry was applied directly to the monolith carrying the Sr/γ-alumina material and then dried and calcined. The finished loading of Pt/γ-alumina on the monolith was roughly 12.5 wt. As seen in FIG. 3, the nitrogen oxide trapping ability of trap B which contained an intimate mixture of the catalyst phases was superior to that of trap C which contained distinct layers of the catalyst phases.

The data of nitrogen oxide trapping efficiency shown in FIGS. 2 and 3 was obtained by subjecting the traps to simulated lean burn exhaust gas containing: 600 ppm NO, 10% $CO_2$, 10% $H_2O$, 0.1% CO, 0.03% $H_2$, 50 ppm $C_3H_6$, and 6% $O_2$. The total gas flow rate was 3 liters/min and the space velocity was 20,000hr$^{-1}$. $NO_x$ trap sorption efficiency was averaged over a 5 minute lean sorption cycle.

We claim:

1. A nitrogen oxide trap useful for trapping nitrogen oxide present in the exhaust gases generated during lean-burn operation of an internal combustion engine, said trap comprising distinct catalyst phases:

(a) a porous support loaded with catalyst comprising 0.1 to 5 weight % platinum; and (b) another porous support loaded with 2 to 30 weight % catalyst of at least one alkaline metal material selected from the group consisting of alkali metal elements and alkaline earth elements, said phase (a) being essentially free of said alkaline metal material, the weight % of catalyst being based on the weight of its porous support, and wherein the catalyst phases (a) and (b) are provided as an intimate mixture thereof.

2. The trap according to claim 1 wherein said porous support of (a) and said another porous support of (b) comprises γ-alumina.

3. The trap according to claim 1 wherein said catalyst phase (a) further comprises components selected from ceria and rhodium.

4. The trap according to claim 1 wherein catalyst phase (a) comprises said support loaded with about 0.5 to 2 wt. percent platinum (b) comprises said second support loaded with about 10 to 20 wt. percent said alkaline metal, each based on the weight of the respective porous support.

5. The trap according to claim 3 wherein said porous support of (a) and said another porous support of (b) comprises γ-alumina.

6. An internal combustion engine exhaust gas catalyst system comprising a nitrogen oxide trap being arranged in the exhaust system and absorbing nitrogen oxides when the air/fuel ratio of exhaust gas flowing into said trap is lean, said nitrogen oxide trap releasing absorbed nitrogen oxides when the oxygen concentration in said exhaust gas is lowered, said nitrogen oxide trap comprising distinct catalyst phases:

(a) a porous support loaded with catalyst comprising 0.1 to 5 weight % platinum; and (b) another porous support loaded with 2 to 30 weight % catalyst of at least one alkaline metal material selected from the group consisting of alkali metal elements and alkaline earth elements, said phase (a) being essentially free of said alkaline metal material, the weight % of catalyst being based on the weight of its porous support, and wherein the catalyst phases (a) and (b) are provided as an intimate mixture thereof.

7. The exhaust gas catalyst system according to claim 6 wherein said porous support of (a) and said another porous support of (b) comprises gamma-alumina.

8. The exhaust gas catalyst system according to claim 7 wherein said catalyst phase (a) further comprises components selected from ceria and rhodium.

9. The exhaust gas catalyst system according to claim 6 wherein catalyst phase (a) comprises said support loaded with about 0.5–2 wt. percent platinum and catalyst phase (b) comprises said support loaded with about 10–20 percent said alkaline metal, each based on the weight of its respective porous support.

10. The exhaust gas catalyst system according to claim 6 which further comprises a three way catalyst positioned upstream of the $NO_x$ trap.

11. The exhaust gas catalyst system according to claim 10 which further comprises a three-way catalyst positioned downstream of the $NO_x$ trap.

12. A process for trapping nitrogen oxides from the exhaust gases generated during lean-burn operation of an internal combustion engine, said process comprising the steps of:

bringing said oxygen-rich exhaust gases, whose oxygen content is at the stoichiometric or more required for oxidizing the components to be oxidized therein, into contact with a nitrogen oxide trap comprising distinct catalyst phases:

(a) a porous support loaded with catalyst comprising 0.1 to 5 weight % platinum; and (b) another porous support loaded with 2 to 30 weight % catalyst of at least one alkaline metal material selected from the group consisting of alkali metal elements and alkaline earth elements, said phase (a) being essentially free of said alkaline metal material, the weight % of catalyst being based on the weight of its porous support, and wherein the catalyst phases (a) and (b) are provided as an intimate mixture thereof.

13. The process according to claim 12 wherein said support for both said phases (a) and (b) comprises gamma-alumina.

14. The trap according to claim 12 wherein said catalyst phase (a) further comprises components selected from ceria and rhodium.

15. The process according to claim 12 wherein (a) comprises said support loaded with about 0.5 to 2 wt. percent platinum and (b) comprises said support loaded with about 10-20 wt. percent said alkaline metal, each based on the weight of the respective porous support.

16. The process according to claim 12 which further comprises the step of contacting said exhaust gases with a three-way catalyst positioned upstream of the nitrogen oxide trap.

17. The process according to claim 16 which further comprises contacting said exhaust gases with a three-way catalyst positioned downstream of the nitrogen oxide trap.

* * * * *